US007975054B2

(12) United States Patent
Hirata et al.

(10) Patent No.: US 7,975,054 B2
(45) Date of Patent: Jul. 5, 2011

(54) NETWORK DEVICE AND CONTROL METHOD OF THE SAME

(75) Inventors: Takashi Hirata, Yokohama (JP); Kenichi Fujii, Yokohama (JP); Masaki Shitano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 11/461,852

(22) Filed: Aug. 2, 2006

(65) Prior Publication Data

US 2007/0067430 A1 Mar. 22, 2007

(30) Foreign Application Priority Data

Aug. 2, 2005 (JP) ................................ 2005-224592

(51) Int. Cl.
*G06F 15/177* (2006.01)
*G06F 15/173* (2006.01)
*G06F 15/16* (2006.01)

(52) U.S. Cl. ......... 709/227; 709/220; 709/223; 709/225

(58) Field of Classification Search ................... 709/227
See application file for complete search history.

(56) References Cited

U.S. PATENT DOCUMENTS

| | | | | |
|---|---|---|---|---|
| 4,377,145 | A | 3/1983 | Nagaishi | |
| 4,377,807 | A | 3/1983 | Freeman | |
| 4,829,519 | A | 5/1989 | Scotton et al. | |
| 5,809,016 | A | 9/1998 | Kreitzer et al. | |
| 6,006,254 | A | 12/1999 | Waters et al. | |
| 6,078,785 | A | 6/2000 | Bush | |
| 6,192,282 | B1 * | 2/2001 | Smith et al. | 700/19 |
| 6,381,241 | B1 | 4/2002 | Ghirnikar et al. | |
| 6,466,971 | B1 * | 10/2002 | Humpleman et al. | 709/220 |
| 6,546,419 | B1 * | 4/2003 | Humpleman et al. | 709/223 |
| 6,611,937 | B1 | 8/2003 | Kadyk et al. | |
| 6,639,893 | B1 * | 10/2003 | Chikenji et al. | 370/217 |
| 7,509,398 | B2 * | 3/2009 | Acharya et al. | 709/219 |
| 2002/0016639 | A1 * | 2/2002 | Smith et al. | 700/9 |
| 2002/0058530 | A1 | 5/2002 | Akama | |
| 2002/0178273 | A1 * | 11/2002 | Pardo-Castellote et al. | 709/230 |
| 2005/0058109 | A1 * | 3/2005 | Ekberg | 370/338 |
| 2005/0063391 | A1 * | 3/2005 | Pedersen | 370/395.21 |
| 2005/0102615 | A1 * | 5/2005 | Roman et al. | 715/513 |

(Continued)

FOREIGN PATENT DOCUMENTS

JP 8-88672 4/1996

(Continued)

OTHER PUBLICATIONS

The references were cited on a PTO892 dated Mar. 27, 2008 as part of an Office Action in U.S. Appl. No. 11/497,389, filed Aug. 2, 2006.

(Continued)

*Primary Examiner* — Aaron Strange
*Assistant Examiner* — Keyvan Emdadi
(74) *Attorney, Agent, or Firm* — Cowan, Liebowitz & Latman, P.C.

(57) ABSTRACT

A network device obtains capability information of a device existing on a network, activates/inactivates one of a plurality of types of communication middleware on the basis of the obtained capability information, and executes communication between devices across the network by using the communication middleware. The network device also analyses a protocol used by communication middleware of another device on the network, and corrects the corresponding communication middleware in accordance with the result of analysis.

3 Claims, 21 Drawing Sheets

U.S. PATENT DOCUMENTS

| | | | | |
|---|---|---|---|---|
| 2005/0265334 | A1 | 12/2005 | Koguchi | |
| 2006/0020689 | A1 * | 1/2006 | Roman et al. | 709/220 |
| 2006/0041924 | A1 * | 2/2006 | Bushmitch et al. | 725/132 |
| 2006/0130107 | A1 * | 6/2006 | Gonder et al. | 725/110 |
| 2006/0150188 | A1 * | 7/2006 | Roman et al. | 718/104 |
| 2006/0288071 | A1 * | 12/2006 | Bigioi et al. | 709/203 |
| 2007/0032888 | A1 | 2/2007 | Hirata et al. | |
| 2007/0115996 | A1 | 5/2007 | Shitano et al. | |
| 2007/0118863 | A1 * | 5/2007 | Son et al. | 725/80 |

FOREIGN PATENT DOCUMENTS

| | | | |
|---|---|---|---|
| JP | 10-336191 | A | 12/1998 |
| JP | 11-234277 | A | 8/1999 |
| JP | 2002-152830 | A | 5/2002 |
| JP | 2002-300226 | A | 10/2002 |

OTHER PUBLICATIONS

The references were first cited in an Office Action dated Oct. 30, 2008, concerning a related application of the subject case, namely U.S. Appl. No. 11/497,389.

An Adaptive Protocol for Cooperative Communications Achieving Asymptotic Minimum Symbol-Error-Rate, Chaiyod Pirak, et al., ICASSP 2006.

JERIM-320: A New 320-Bit Hash Function Compared to Hash Functions with Parallel Branches, International Journal of Computer Science and Applications, Sheena Mathew, et a., vol. 5, No. 4, pp. 11-25 2008.

EasiPC: A Packet Compression Mechanism for Embedded WSN, Proceedings of the 11th IEEE International Conference on Embedded and Real-Time Computing System and Applications (RTCSA'05), Hailing Ju, et al. IEEE 2005.

U.S. Patent Application Publication #1 and Patent Documents 1-3 were cited in a Feb. 1, 2010 Japanese Office Action, which is enclosed without English Translation, that issued in Japanese Patent Application No. 2005-224592.

The above Foreign Document #4 was cited in a Feb. 1, 2010 Japanese Office Action, which is enclosed without English Translation, that issued in Japanese Patent Application No. 2005-233336 and related to U.S. Appl. No. 11/497,389.

* cited by examiner

FIG. 7

GET / HTTP / 1.1

Accept-Language : ja

User-Agent : OriginalBrowser / 1.0

Connection : Keep-Alive

FIG. 8

HTTP / 1.1 400 Bad Request

Date : Wed, 15 Dec 2004 10 : 00 : 01 GMT

Server : OriginalServer / 1.0

Content-Length : 0

Connection : close

FIG. 9

```
get / HTTP / 1.1
Accept-Language : ja
User-Agent : OriginalBrowser / 1.0
Connection : Keep-Alive
```

FIG. 10

```
HTTP / 1.1 200 OK
Date : Wed, 15 Dec 2004 10 : 00 : 40 GMT
Server : OriginalServer / 1.0
Content-Length : 0
Connection : close
```

| IP Address | Existing |
|---|---|
| 192.168.0.11 | True |
| 192.168.0.12 | True |
| 192.168.0.22 | false |
| 192.168.0.19 | false |
| 192.168.0.114 | True |
| 192.168.0.14 | false |
| 192.168.0.36 | false |
| 192.168.0.20 | True |

| IP Address (1601) | Message (1602) | beforeStat (1603) | afterStat (1604) | existingCommand (1605) |
|---|---|---|---|---|
| 192.168.0.11 | POST/control HTTP/1.1<br>HOST : 192.168.0.11<br>SAOPACTION :"urn : schemas : upnp-org : service : PrintBasic : 2#createdJob"<br><soap : Envelope<br>xmlns : soap ="http://schemas_xmlsoap.org/soap/envelope/" xmlns : xsi ="http://www.w3.org/2001/XMLSchema-instance"<br>xmlns : xsd ="http://www.w3.org/2001/XMLSchema"><br><soap : Header><br></soap : Header><br><soap : Body><br><Print xmlns ="http://tempuri.org/"><br><input>ppp.txt</input><br></Print><br></soap : Body><br></soap : Envelope> | PrinterState =idle | PrinterState =processing | Print |
| 192.168.0.20 | POST/control HTTP/1.1<br>HOST : 192.168.0.20<br>SAOPACTION :"urn : schemas : canon.com : scaning#scan"<br><soap : Envelope<br>xmlns : soap ="http://schemas_xmlsoap.org/soap/envelope/" xmlns : xsi ="http://www.w3.org/2001/XMLSchema-instance"<br>xmlns : xsd ="http://www.w3.org/2001/XMLSchema"><br><soap : Header><br></soap : Header><br><soap : Body><br><scaning xmlns ="http://tempuri.org/"><br></scaning><br></soap : Body><br></soap : Envelope> | idle | processing | scan |
| 192.168.0.12 | POST/control HTTP/1.1<br>HOST : 192.168.0.12<br>SAOPACTION :"urn : canon.com : light#PowerOn"<br><soap : Envelope<br>xmlns : soap ="http://schemas_xmlsoap.org/soap/envelope/ " xmlns : xsi ="http://www.w3.org/2001/XMLSchema-instance"<br>xmlns : xsd ="http://www.w3.org/2001/XMLSchema"><br><soap : Header><br></soap : Header><br><soap : Body><br><PowerOn xmlns ="http://tempuri.org/"><br></PowerOn><br></soap : Body><br></soap : Envelope> | off | on | linghtOn |

| | |
|---|---|
| WATCHING TIME | Web, 15 Dec 2004 10:00:20 |
| TRANSMISSION SOURCE ADDRESS | 192. 168. 0. 3 |
| TRANSMISSION DESTINATION ADDRESS | 192. 168. 0. 4 |
| TRANSMISSION SOURCE PORT | 12345 |
| TRANSMISSION DESTINATION PORT | 80 |
| DIFFERENCE | diff GetMessage<br>1cl<br>< GET / HTTP / 1.1<br>---<br>>get / HTTP1.1 |

NETWORK DEVICE AND CONTROL METHOD OF THE SAME

BACKGROUND OF THE INVENTION

1. Field of the Invention

The present invention relates to a network device connected to a network, and a control method of the network device.

2. Description of the Related Art

With the progress of computer technologies, a system in which office devices and general household devices which conventionally have only a single function and are not designed to be organically interconnected with each other are connected to other devices across a network and execute common processing is proposed. As techniques which realize this fusion across device networks, protocols such as UPnP (Universal Plug and Play), Jini, and Jxta are known.

UPnP is communication software requiring relatively high-level function processing such as the HTTP technique or XML technique, so it is not easy to always individually develop and install UPnP in each device. Therefore, software of a common communication part of UPnP or the like is generally separately installed in the form of middleware. Also, as the performance of a device having a communication function improves, it is being demanded to install a plurality of middleware programs in a single device. For example, to implement a device having a communication function which can be dynamically found even by Jini in UPnP, two types of corresponding middleware programs must be installed. To cope with various protocols, therefore, a plurality of middleware programs corresponding to the protocols must be installed in a device.

To execute processing by exchanging data between devices while middleware programs corresponding to a plurality of protocols are installed in each device as described above, it is necessary to select devices having middleware programs in which the same protocol is installed. However, the number of installable protocols is limited, and it is impossible to install all the existing protocols in each device. Even if all the existing protocols can be installed in a device, it is impossible to cope with a newly developed protocol. Also, the specifications of each protocol have vague portions, i.e., the specifications are not strictly defined. Therefore, even when the developer of a device has intended to install a protocol completely in accordance with its specifications, ambiguous portions of the specifications of the protocol may produce a difference between interpretations, and this may cause a communication failure between devices.

In addition, a protocol is often installed under conditions not completely complying with its specifications. Furthermore, if a device using a protocol not complying with its specifications is used as a defacto standard, a newly developed device having a protocol complying with the original specifications may not normally communicate with the device using the protocol as the defacto standard. An example of communication failures is a case in which a certain protocol does not distinguish between uppercase letters and lowercase letters, whereas another protocol distinguishes between them. When an XML-related protocol such as SOAP is used, communication may fail due to the presence/absence of a name space.

Installing a plurality of communication middleware programs which are more and more sophisticated, complicated, and enlarged imposes large limitations on the installation environment of a device having a limited computation capability, so efficiently handling this is becoming a serious problem. Japanese Patent Laid-Open No. 8-88672 is one proposal concerning protocol monitoring which finds a difference between protocols in order to ensure communication between devices using these protocols. This reference makes it possible to detect an error of a protocol, and automatically point out the error.

Unfortunately, it is not easy to impart this function to an already shipped device. Also, even when this protocol monitoring is used, it is impossible to cope with all devices existing on the market, so the error detection cannot be well performed. Before purchasing a device, therefore, the user must find a report or the like on, e.g., the Internet to confirm types of devices with which the intended device can communicate.

SUMMARY OF THE INVENTION

It is an object of the present invention to make communication middleware installed in a device having a communication function adaptable to a network.

According to the present invention, there is provided with a network device comprising:

communication management means for managing a plurality of types of communication middleware;

obtaining means for obtaining capability information of a device existing on a network;

judgment means for judging which communication middleware of the plurality of types of communication middleware of the communication management means is to be activated/inactivated, on the basis of the capability information obtained by the obtaining means;

communication means for executing communication between devices across the network by using communication middleware found to be activated by the judgment means;

analysis means for analyzing a protocol used by communication middleware of another device on the network; and protocol correction means for correcting corresponding communication middleware of the communication management means in accordance with a result of analysis by the analysis means.

According to the present invention, there is provided with a control method of a network device comprising a plurality of types of communication middleware, comprising:

an obtaining step of obtaining capability information of a device existing on a network;

a judgment step of judging which communication middleware of the plurality of types of communication middleware is to be activated/inactivated, on the basis of the capability information obtained in the obtaining step;

a communication step of executing communication between devices across the network by using communication middleware found in the judgment step;

an analysis step of analyzing a protocol used by communication middleware of another device on the network; and a correction step of correcting corresponding communication middleware in accordance with a result of analysis in the analysis step.

Further features of the present invention will become apparent from the following description of exemplary embodiments (with reference to the attached drawings).

BRIEF DESCRIPTION OF THE DRAWINGS

FIG. 7 depicts a view showing an example of a message by protocol A according to the embodiment;

FIG. 8 depicts a view showing an example of an error message according to the embodiment;

FIG. 9 depicts a view showing an example of a message by protocol A' according to the embodiment;

FIG. 10 depicts a view showing an example of a message which is returned as a return value according to the embodiment;

FIG. 15 depicts a view showing a practical example of a command table of the unknown protocol learning unit according to the embodiment;

FIG. 16 depicts a view showing a practical example of a protocol recording table of the unknown protocol learning unit according to the embodiment;

FIG. 21 depicts a view showing a practical example of a table storing difference information extracted by a difference extraction unit according to the embodiment.

DESCRIPTION OF THE EMBODIMENTS

Preferred embodiments of the present invention will now be described in detail in accordance with the accompanying drawings. Note that the following embodiments do not limit inventions according to the scope of claims, and that not all combinations of characteristic features explained in the embodiments are necessarily essential to solving means of the inventions.

Figure 1:
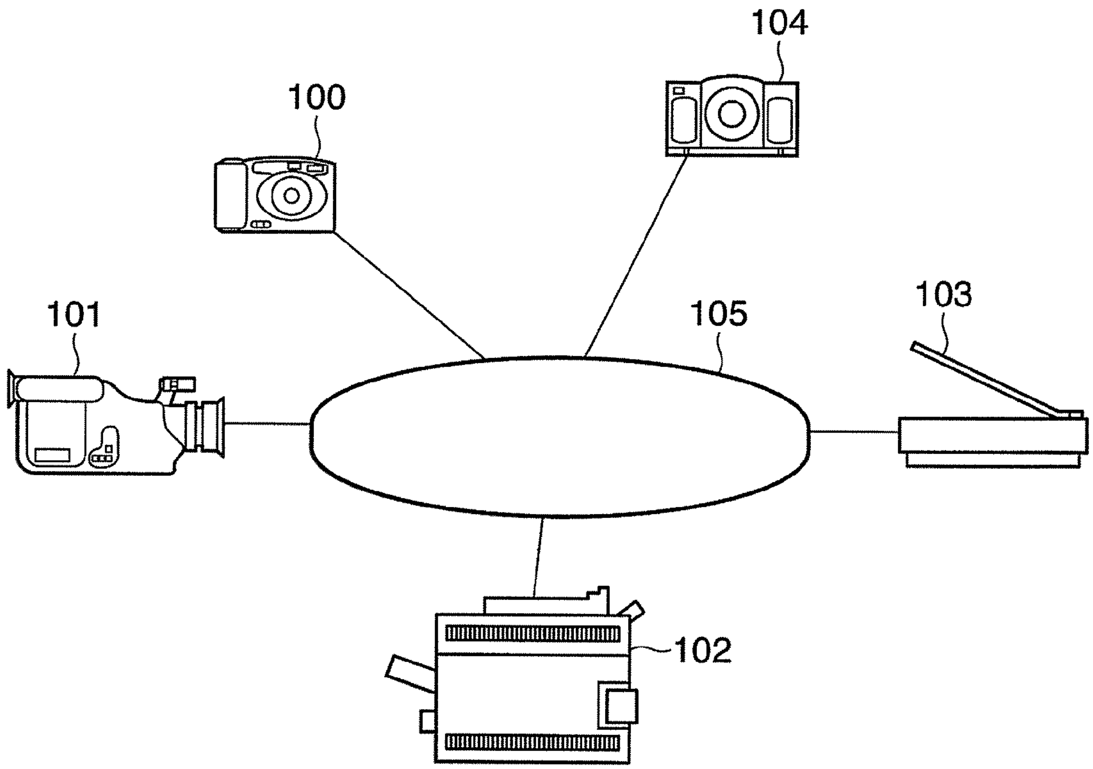
FIG. 1 depicts a view showing the whole of a network system according to an embodiment of the present invention.

FIG. 1 depicts a view showing the whole of a network system according to an embodiment of the present invention.

Referring to FIG. 1, a digital camera 100, digital video camera 101, printer 102, scanner 103, and projector 104 are connected to a network 105. Note that although these devices are exemplified in this embodiment, the present invention is not limited to these devices.

Figure 2:
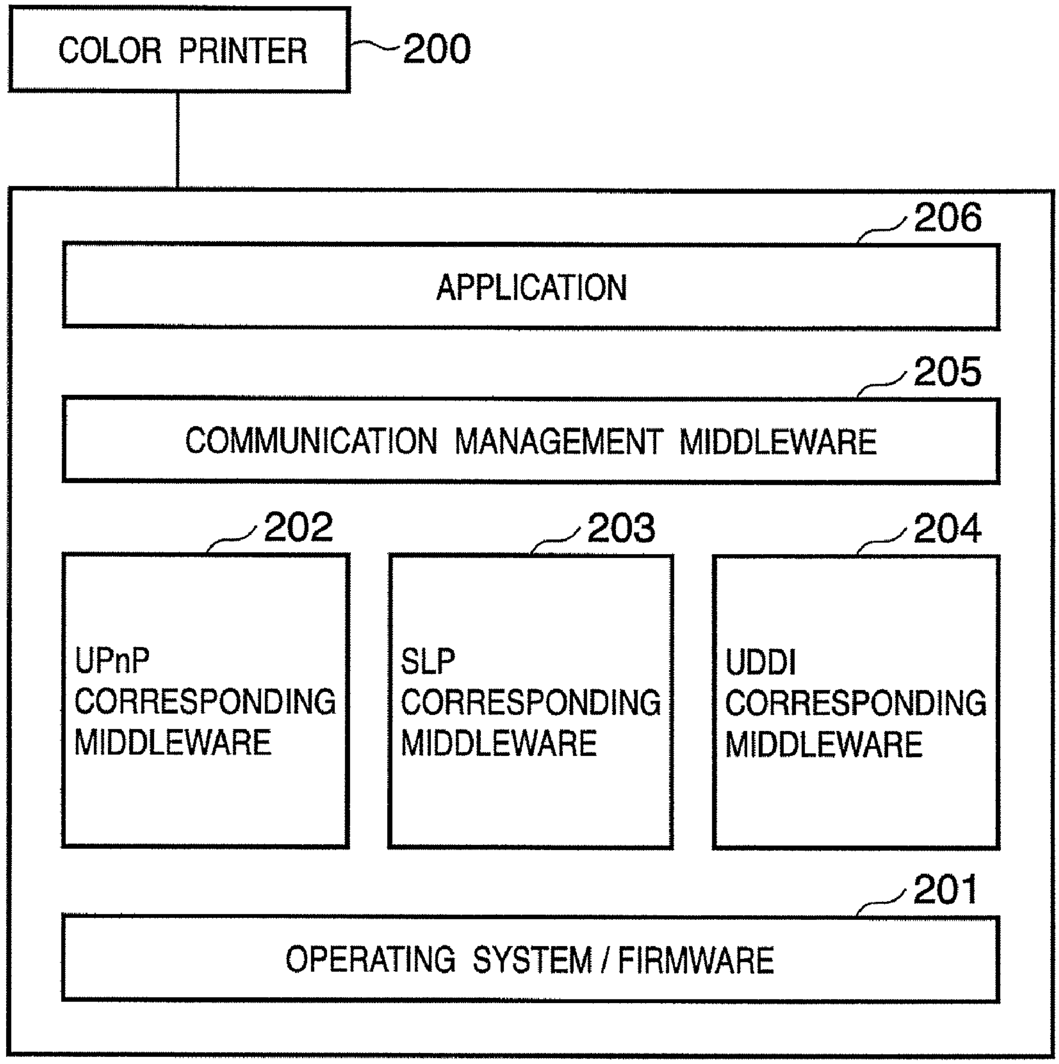
FIG. 2 is a functional block diagram showing an example of a device according to the embodiment of the present invention, and the internal configuration of software.

FIG. 2 depicts a view showing an outline of processing in a device according to this embodiment. Although FIG. 2 shows a practical function of each processing unit as an example for the sake of descriptive simplicity, the present invention is not limited to this configuration. Also, the arrangement of the device shown in FIG. 2 is simplified in order to explain an outline of the processing according to this embodiment.

FIG. 2 is a functional block diagram showing an example of a device according to the embodiment of the present invention, and the internal configuration of software.

A color printer 200 is a device having a function according to this embodiment, and is a high-level function color printer connectable to a network. Like an ordinary printer, the color printer 200 receives document data or printing data from a client such as a PC, and prints out a color image on a printing sheet. The color printer 200 also has additional functions such as printing data management, reprinting, and log management. The software configuration of the color printer 200 is as follows. First, operating system/firmware 201 which provides the basic processing is installed. On the operating system/firmware 201, middleware programs 202 to 205 each of which provides a common function are installed. An application 206 is installed in the uppermost portion (highest layer). The application 206 is used to provide additional functions, e.g., log management described above, to the color printer 200. Although FIG. 2 shows only one application 206 for descriptive convenience, a plurality of applications may also exist.

The middleware programs will be explained in more detail below.

Reference numerals 202 to 205 denote communication middleware programs for achieving communication processes on the network. That is, UPnP corresponding middleware 202, SLP corresponding middleware 203, and UDDI corresponding middleware 204 correspond to their respective communication protocols. Communication management middleware 205 provides an interface which allows the application 206 to integrally control these middleware programs.

Figure 3:
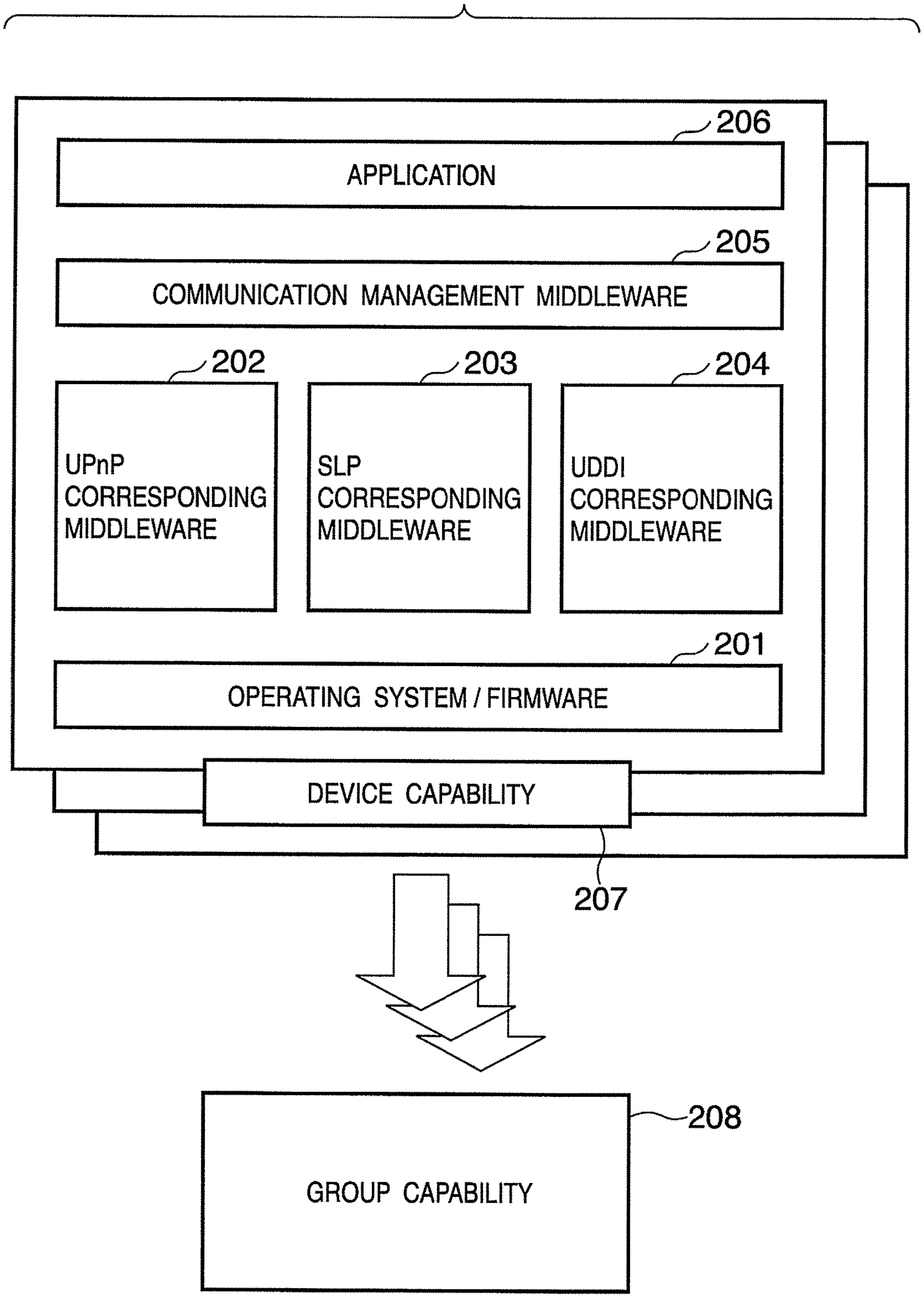
FIG. 3 depicts a view conceptually showing processing which occurs when a color printer according to the embodiment is powered on to start operating.

FIG. 3 depicts a view conceptually showing processing which occurs when the color printer 200 is powered on to start operating.

First, pieces of capability information of the operating system/firmware 201, the application 206, and each software incorporated into the color printer 200 are collected. Then, device capability 207 as capability information which belongs to the color printer 200 is generated. Group capability 208 is formed by collecting the device capabilities 207 from individual devices across the network 105. The contents of the group capability 208 formed by the device capabilities 207 change in accordance with the functions and capabilities of devices forming the group. For example, when the digital camera 100 exists in the network 105, it is determined that a color management function which increases the color reproducibility when image information obtained by the digital camera 100 is printed is essential. As a consequence, capability information including the color management function is generated as the group capability 208. On the other hand, the monochrome high-speed document scanner 103 exists instead of a digital camera, the group capability 208 including a monochrome printing function in a draft mode which can follow a high-speed scanning process is generated. Pieces of function information such as a communication protocol which can be used in common and a corresponding data format are also generated as the group capability 208.

Figure 4:
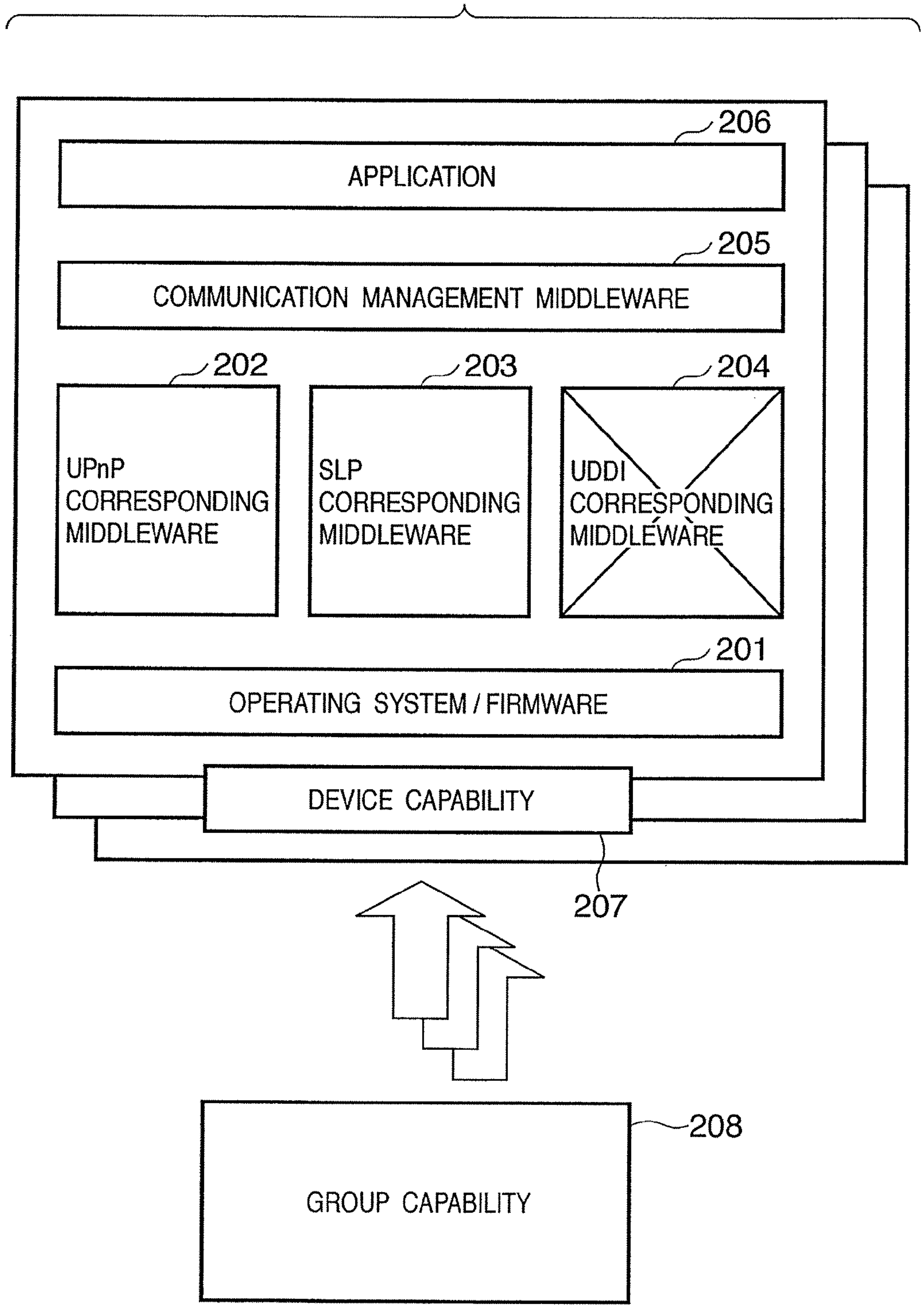
FIG. 4 depicts a view showing the state in which built-in communication middleware of the color printer stops operating due to an optimization process using group capability and device capability in the color printer.

FIG. 4 shows the state in which some communication middleware programs incorporated into the color printer 200 stop operating due to an optimization process using the group capability 208 and device capability 207 in the color printer 200. An example of processing which leads the color printer 200 to this state will be explained below.

First, assume that the group capability 208 calculated from the device capability of each device deduces that none of the devices connected to the network 105 uses UDDI as a communication means (a communication means for searching for another device). In this case, the UDDI corresponding middleware 204 in each device stops operating.

It should be noted that the functions which the color printer 200 including the application 206 can provide to the user in this state remain unchanged. That is, although the UDDI corresponding middleware 204 stops operating because it cannot be used in the present device configuration on the network, the functions which the device network including the color printer 200 can provide to the user remain exactly the same. Also, the application 206 continues to perform processing via the communication management middleware 205 in the communication process, and hence is not adversely affected by the stop of the operation by the UDDI corresponding middleware 204.

Figure 5:
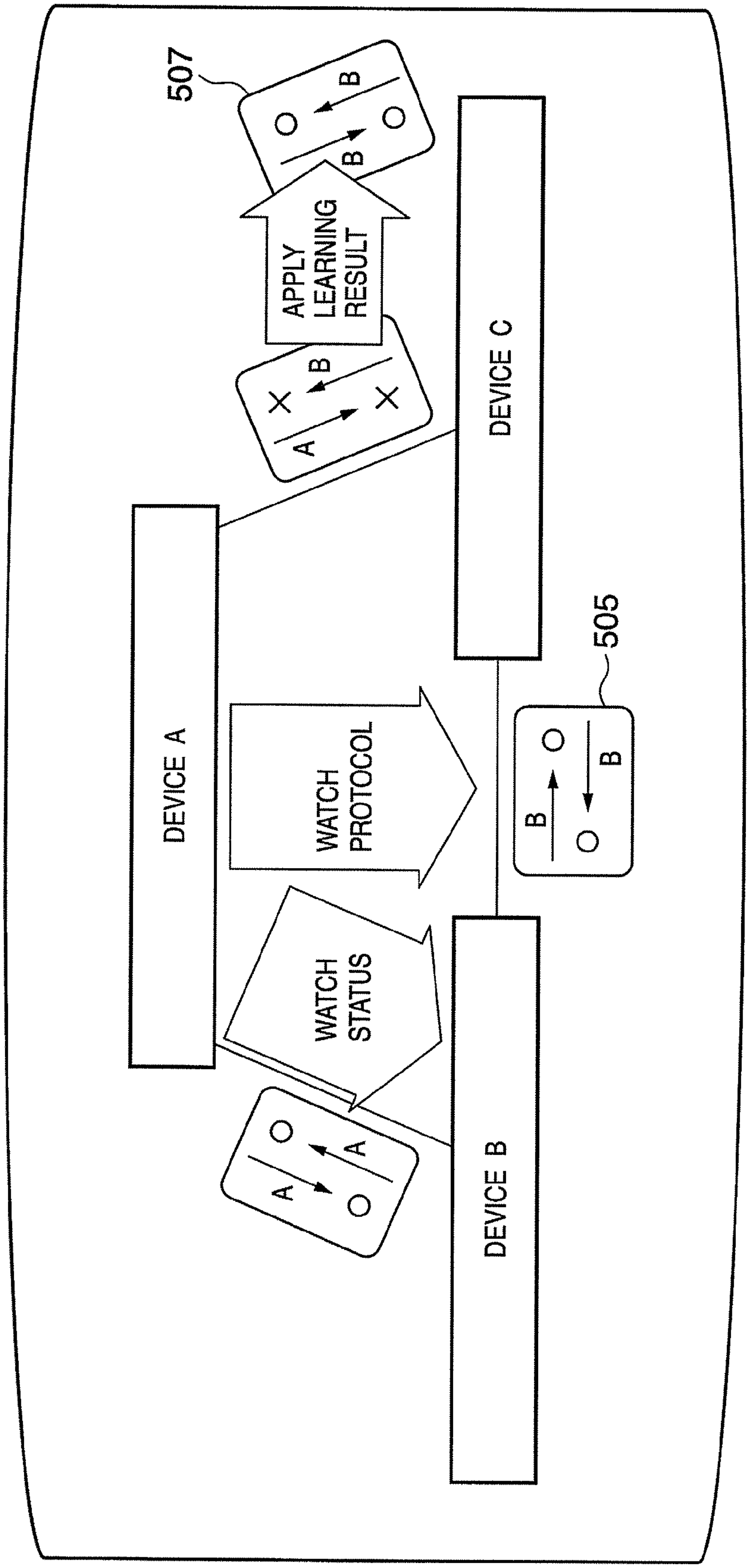
FIG. 5 is a block diagram for explaining the characteristic features of the embodiment.

FIG. 5 is a block diagram for explaining the characteristic features of the embodiment of the present invention.

Referring to FIG. 5, device A complying with protocol A, device B complying with both protocols A and B, and device C complying with protocol B are connected. Device A watches the state of device B, and also watches protocol B used in communication 505 between devices B and C. In addition, a message using the protocol B being watched and the state of device B are recorded in association with each other. Furthermore, the state of device B which is changed by a message using the protocol B between devices B and C is made to correspond to a message capable of obtaining the same state in the protocol A usable by device A. When the correspondences are accumulated, device A becomes able to interpret the meaning of a message using the protocol B, and simulate the protocol B. Accordingly, mutual communication 507 can be performed between devices A and C by using the simulated protocol B.

Figure 6:
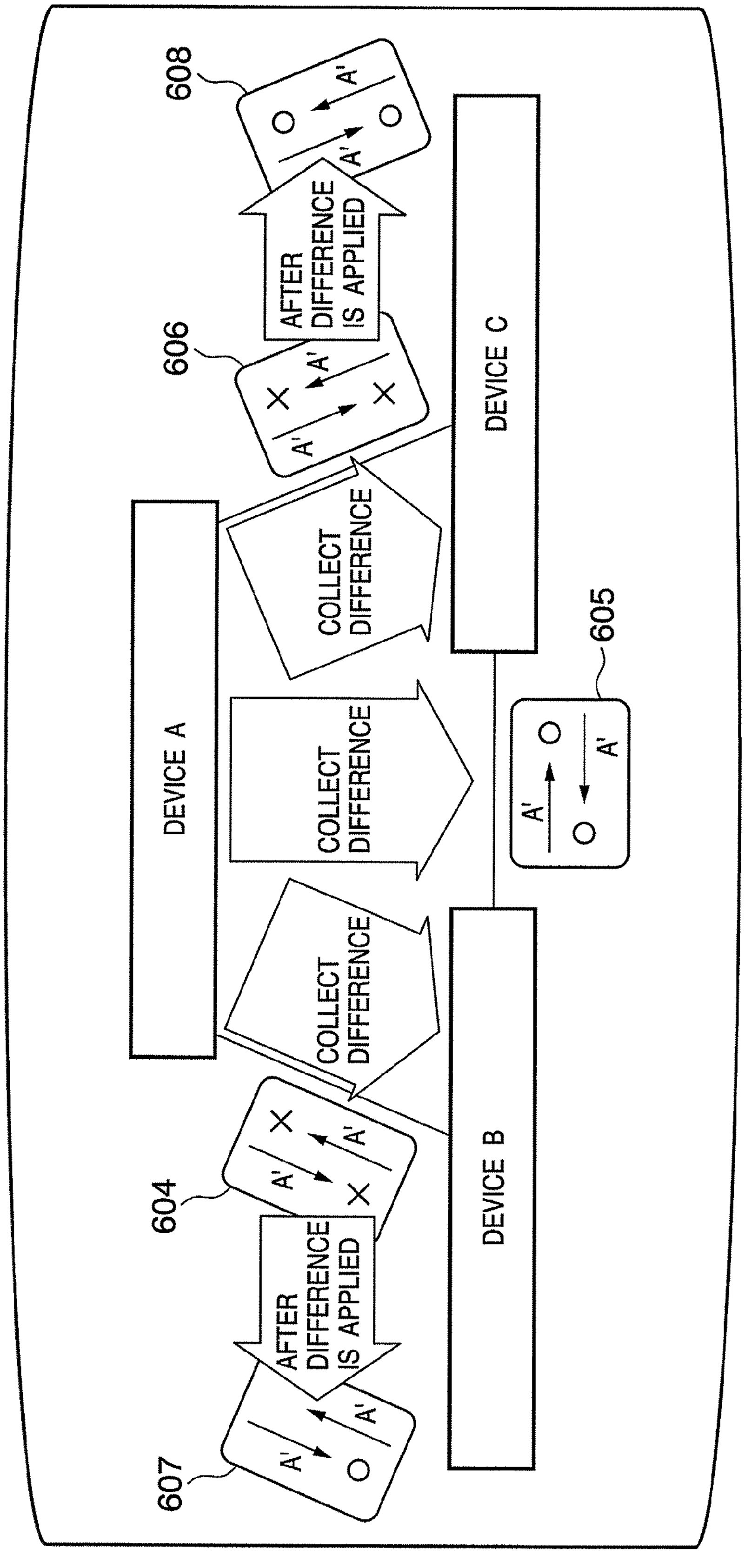
FIG. 6 is a block diagram for explaining a communication process in a network according to the embodiment.

FIG. 6 is a block diagram for explaining a communication process in the network according to this embodiment.

This network is formed by a plurality of devices complying with the protocol A. That is, devices A, B, and C complying with the protocol A are connected. Between devices B and C, mutual application is secured using protocol A' which does not strictly comply with the protocol A due to misunderstanding caused by the vagueness of the specification of the protocol A. In this network, device A watches a message 604 received from device B, a message 606 received from device C, and a message 605 communicated between devices B and C using the protocol A'. More specifically, the network interface of device A is operated in a promiscuous mode to receive all packets flowing across the network 105 and collect communication data. The difference between the protocols A and A' is detected by analyzing the communication data thus collected, and applied to a protocol usable by device A. Consequently, device A becomes able to perform communication 607 with device B and communication 608 with device C using the protocol A' as a local rule, thereby assuring the mutual application between devices A to C.

For example, assume that the protocol A is "HTTP/1.1" (RFC2616, R. Fielding, J. Gettys, J. Mogul, H. Frystyk, L. Masinter, P. Leach, T. Berners-Lee, "Hypertext Transfer Protocol--HTTP/1.1", http://www.ietf.org/rfc/rfc2616.txt, June, 1999), a message shown in FIG. 7 is in the protocol A, and a message shown in FIG. 9 is in the protocol A'. In this case, in the communication 604 between devices A and B and in the communication 606 between devices A and C, a difference between uppercase letters and lowercase letters such as character strings "GET" and "get" in the first rows is produced. In a case like this, an error message shown in FIG. 8 is returned.

Accordingly, device A collects communication data by watching the message 604 received from device B, the message 606 received from device C, and the message 605 communicated between devices B and C. The difference between the protocols A and A' (the difference between the character strings "GET" and "get" in the first rows shown in FIGS. 7 and 9) is detected by analyzing the communication data thus collected, and applied to a protocol (protocol A) usable by device A. As a consequence, device A becomes able to perform the communication 607 with device B and communication 608 with device C by the protocol A' (FIG. 9) as a local rule (messages shown in FIG. 10 are returned as a return value) . In this manner, three devices A, B, and C can communicate with each other.

Figure 11:
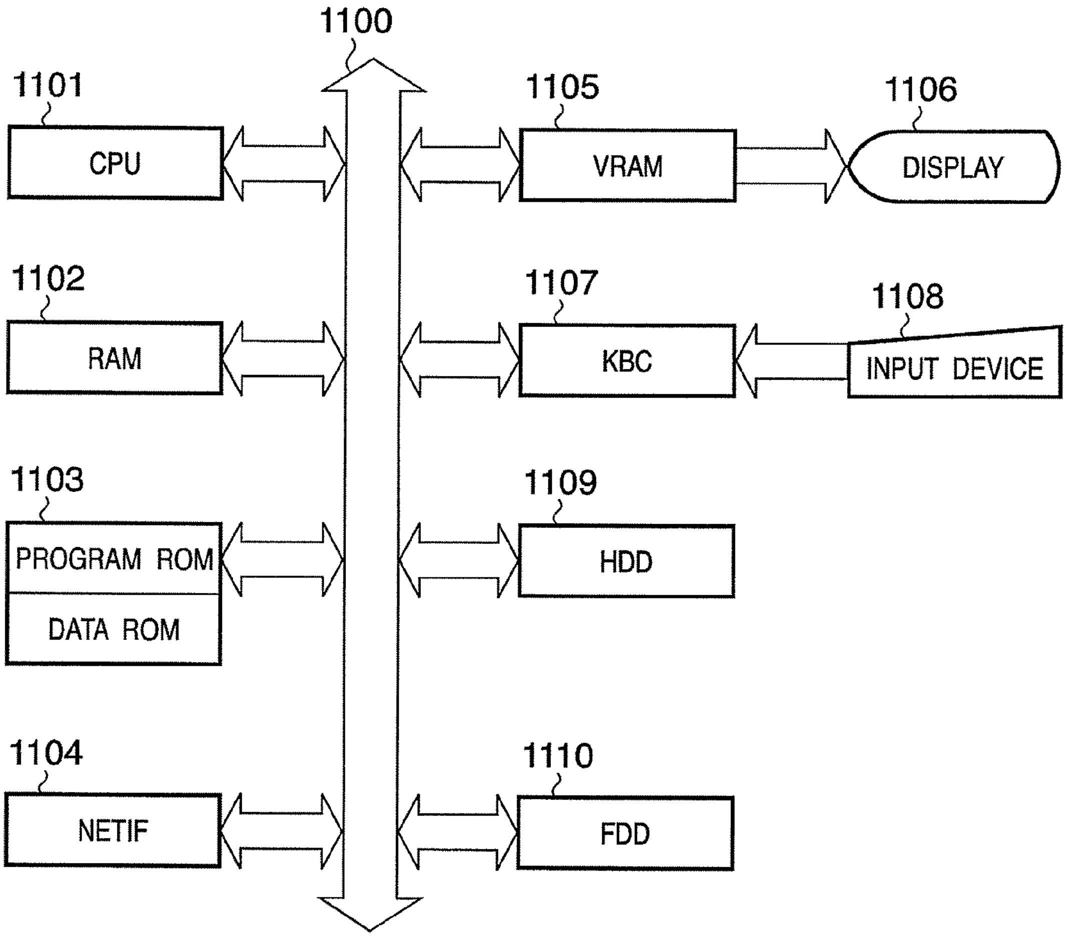
FIG. 11 is a block diagram for explaining the arrangement of a PC (Personal Computer) as an example of a device connected to a network system (profile management system) according to the embodiment.

FIG. 11 is a block diagram for explaining the arrangement of a PC (Personal Computer) as an example of devices connected to the network system (profile management system) according to this embodiment. Note that these devices need not be the cameras 100 and 101, printer 102, scanner 103, and projector 104 described earlier and this PC (Personal Computer), but may also be a workstation, a notebook PC, palmtop PC, various household electric products such as a television set incorporating a computer, a game machine having a communication function, a telephone, a facsimile apparatus, a cell phone, a PHS, a terminal having a communication function of communicating with another device such as a digital pocketbook, and combinations of these devices.

Referring to FIG. 11, a CPU 1101 is a central processing unit (to be referred to as a CPU hereinafter) which controls the whole PC. A RAM 1102 is a random access memory which is used as a main memory of the CPU 1101, and also provides an area for an execution program and an execution area and data area of the program. A program ROM 1103 is a read only memory that records operation procedures of the CPU 1101. The ROM 1103 includes a program ROM that records basic software (OS) as a system program for controlling the PC, and a data ROM that records information necessary to operate the system. Note that an HDD 1109 (to be described later) may also be used instead of the ROM 1103. A network interface (NETIF) 1104 controls data transfer between the devices across the network 105, and also diagnoses the connection statuses.

A VRAM 1105 is a video RAM in which image data to be displayed on the screen of a display 1106 is rasterized for displaying the operating state of the PC. The display 1106 includes a display unit such as a CRT or liquid crystal display. A keyboard controller (KBC) 1107 receives key signals and the like from an input device 1108 including a keyboard, pointing device, and the like, and outputs the signals to a system bus 1100. The input device 1108 is an external input device, e.g., a keyboard for accepting operations performed on the PC by the user of the PC.

The HDD 1109 is a hard disk drive in which the OS and various application programs are installed. The HDD 1109 is also used to store data such as image information. Note that application programs in this embodiment are software programs for implementing various means constituting this embodiment. An FDD 1110 is a floppy (registered trademark)

disk drive or CD-ROM drive in which a removable storage medium is inserted and data is read out from and written in the medium. The FDD 1110 is used to read out the above-mentioned application programs and the like from the medium. This disk drive will be referred to as an FDD hereinafter. Note that the application programs and data stored in the HDD 1109 may also be stored in the FDD 1110. The system bus 1100 is an I/O bus (including an address bus, data bus, and control bus) which connects the individual units described above.

Figure 12:
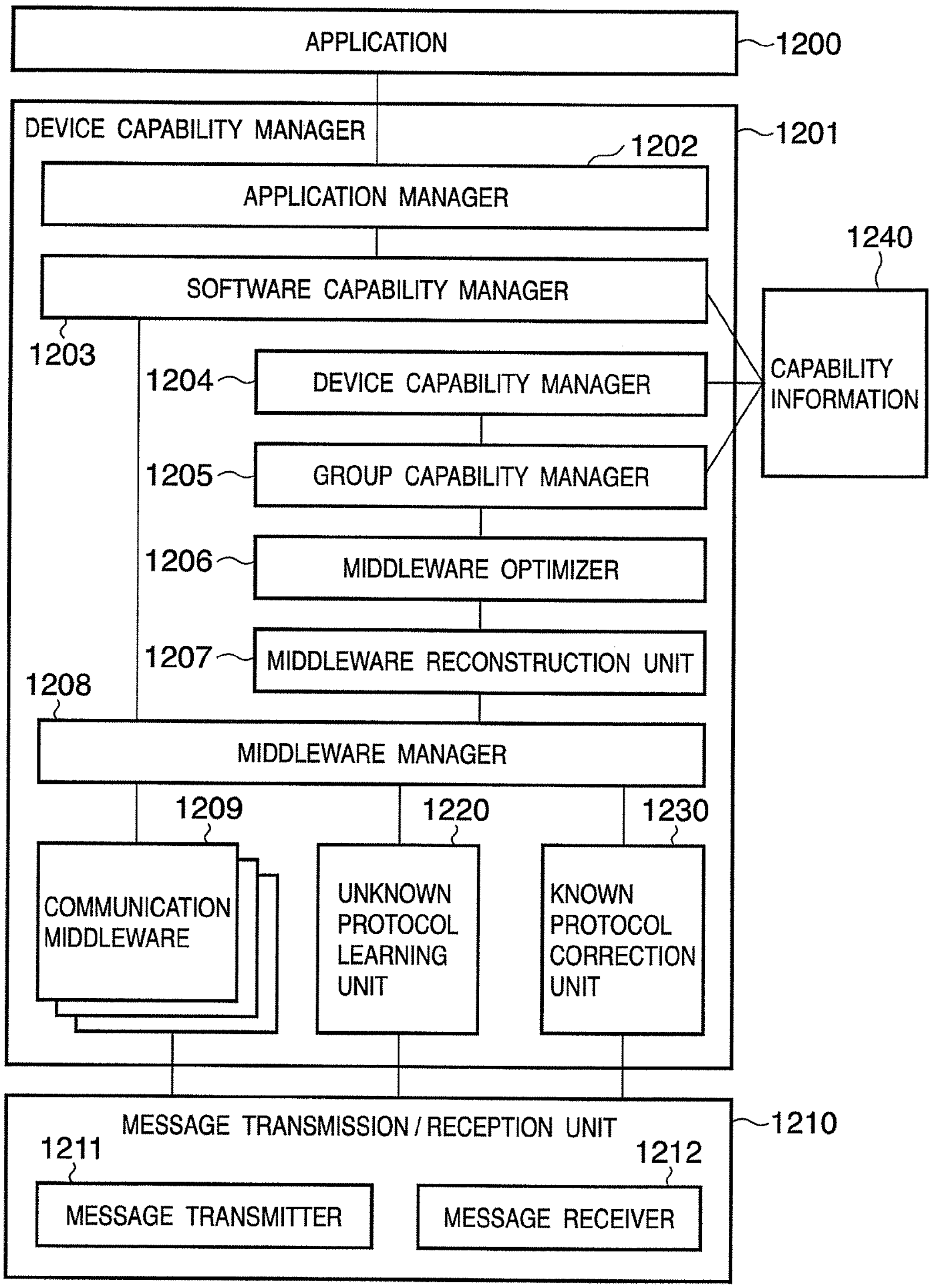
FIG. 12 is a functional block diagram of an application module (device capability management system) installed in a device according to the embodiment of the present invention.

FIG. 12 is a functional block diagram of an application module (device capability management system) installed in a device according to the embodiment of the present invention. Note that this application module is achieved by supplying a recording medium that records the program code of software which implements the functions of this embodiment to a system or apparatus, and reading out and executing the program code stored in the storage medium by a computer (CPU or MPU) of the system or apparatus. In this case, the program code read out form the recording medium implements the functions of the above-mentioned embodiment, so the storage medium that records the program code constitutes the functions of the embodiment of the present invention.

Also, the present invention is not limited to the case in which the functions of the embodiment are implemented by executing the readout program code by the computer. That is, the present invention also includes a case in which the OS (Operating System) or the like running on the computer executes part or the whole of actual processing on the basis of instructions by the program code, thereby implementing the functions of the embodiment.

Furthermore, the present invention includes a case in which the program code read out from the storage medium is written in a memory of a function expansion board inserted into the computer or of a function expansion unit connected to the computer, and a CPU or the like of the function expansion board or function expansion unit executes part of the whole of actual processing on the basis of instructions by the program code, thereby implementing the functions of the embodiment.

This device capability management system comprises an application 1200, device capability manager 1201, and message transmission/reception unit 1210. The device capability manager 1201 includes an application manager 1202, software capability manager 1203, device capability manager 1204, group capability manager 1205, middleware optimizer 1206, middleware reconstruction unit 1207, middleware manager 1208, communication middleware 1209, unknown protocol learning unit 1220, and known protocol correction unit 1230. The message transmission/reception unit 1210 includes a message transmitter 1211 and message receiver 1212.

Figure 13:
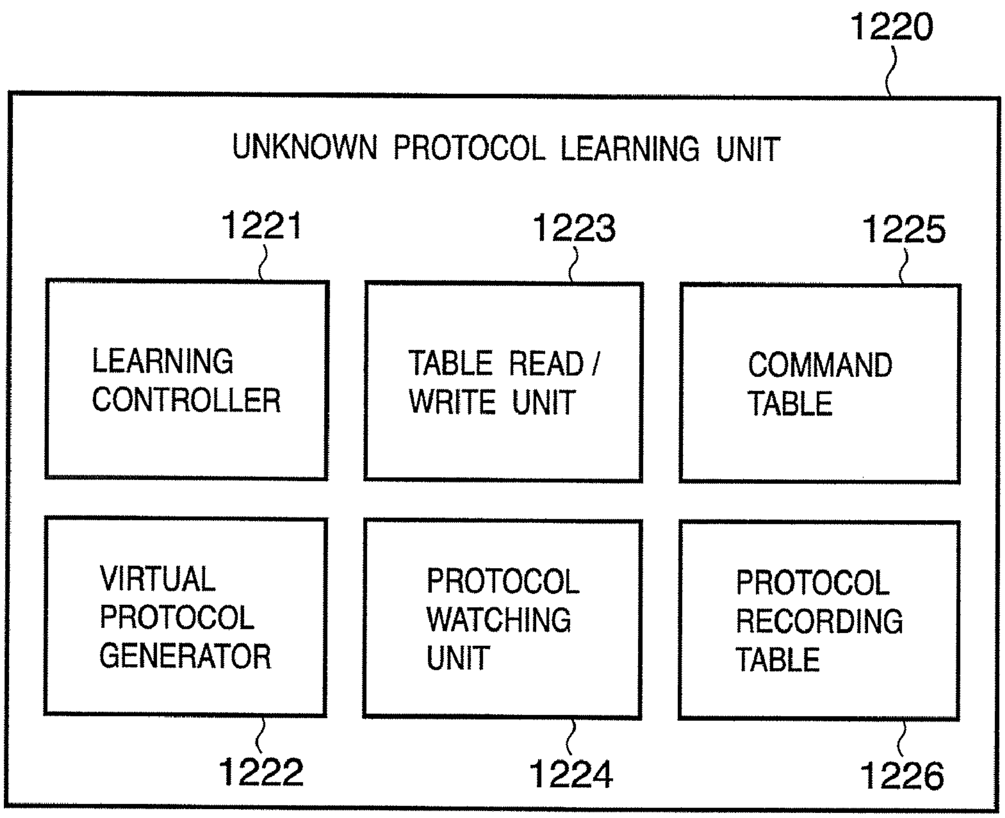
FIG. 13 is a block diagram showing the module configuration of an unknown protocol learning unit according to the embodiment.

FIG. 13 is a block diagram showing the module configuration of the unknown protocol learning unit 1220 according to this embodiment.

The unknown protocol learning unit 1220 includes a learning controller 1221, virtual protocol generator 1222, table read/write unit 1223, protocol watching unit 1224, command table 1225, and protocol recording table 1226.

Figure 14:
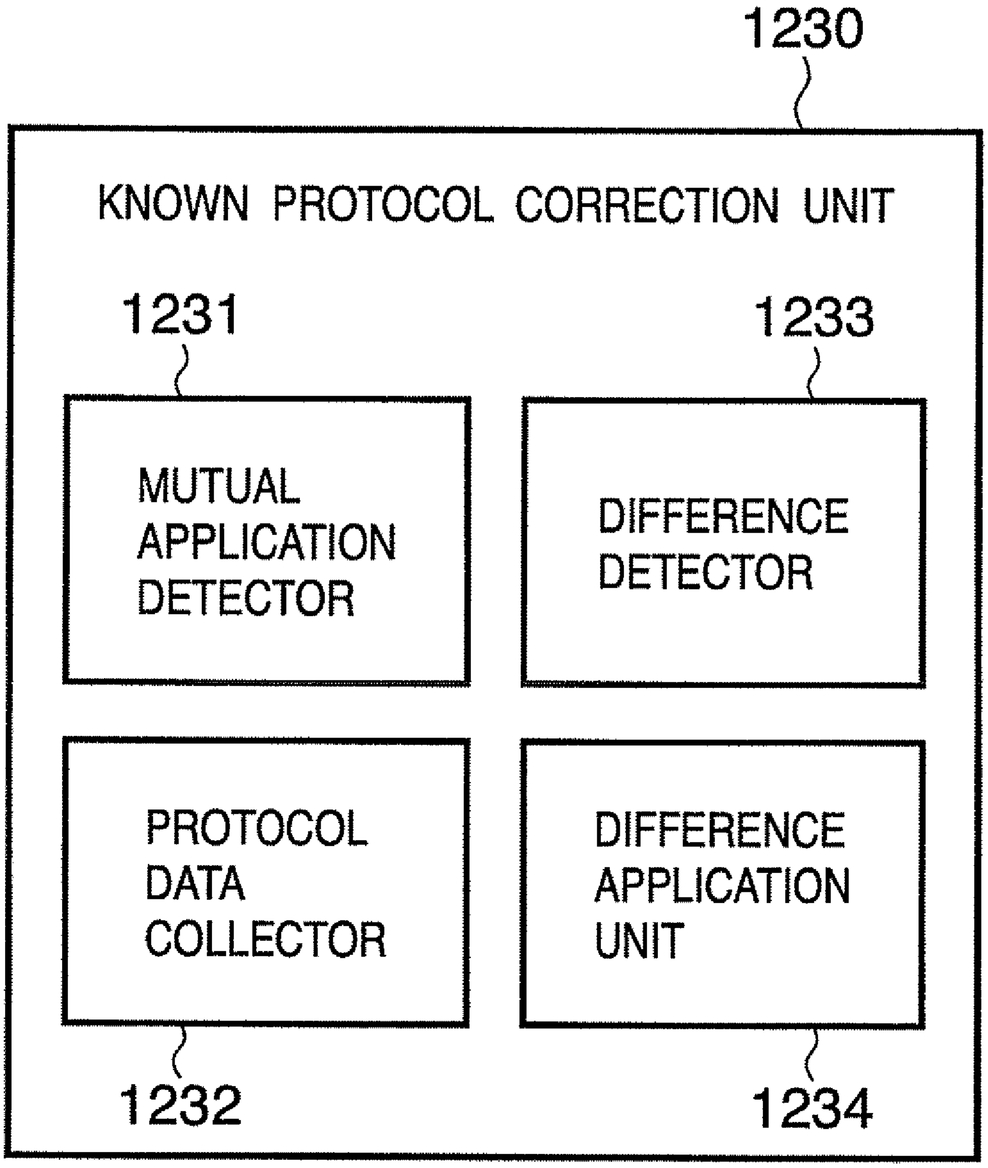
FIG. 14 is a block diagram showing the module configuration of a known protocol correction unit according to the embodiment.

FIG. 14 is a block diagram showing the module configuration of the known protocol correction unit 1230 according to this embodiment.

The known protocol correction unit 1230 includes a mutual application detector 1231, protocol data collector 1232, difference detector 1233, and difference application unit 1234.

Note that the contents of processing in each unit shown in FIGS. 12 to 14 will be timely described below in the following explanation.

FIG. 15 depicts a view showing a practical example of the command table 1225 in the unknown protocol learning unit 1220 according to this embodiment.

The command table 1225 includes an IP address (IP Address) item 1501 and protocol applicability (Existing) item 1502. Retrieve, read/write, addition, and deletion can be performed for each item, and the protocol applicability item 1502 is uniquely specified for the IP address item 1501. The IP address item 1501 stores the IP address of a device connected to the network 105. The protocol applicability item 1502 stores a character string “True (applicable)” or “false (inapplicable)”.

FIG. 16 depicts a view showing a practical example of the protocol recording table 1226 in the unknown protocol learning unit 1220 according to this embodiment.

The protocol recording table 1226 has an IP address item 1601, message (Message) item 1602, pre-state (beforeStat) item 1603, post-state (afterStat) item 1604, and effective command (existingCommand) item 1605. Retrieve, read/write, addition, and deletion can be performed for each item. Also, the message item 1602, pre-state item 1603, post-state item 1604, and effective command item 1605 are uniquely specified for the IP address item 1601. The IP address item 1601 stores the IP address of a device connected to the network 105. The message item 1602 stores a message exchanged between devices and flowing across the network 105. The pre-state item 1603 and post-state item 1604 store pieces of information indicating the states of a device connected to the network 105 before and after, respectively, a message is received. The effective command item 1605 stores a corresponding command, by which the states described in the pre-state item 1603 and post-state item 1604 can occur, in a protocol preinstalled in this device when it is shipped.

Figure 17:
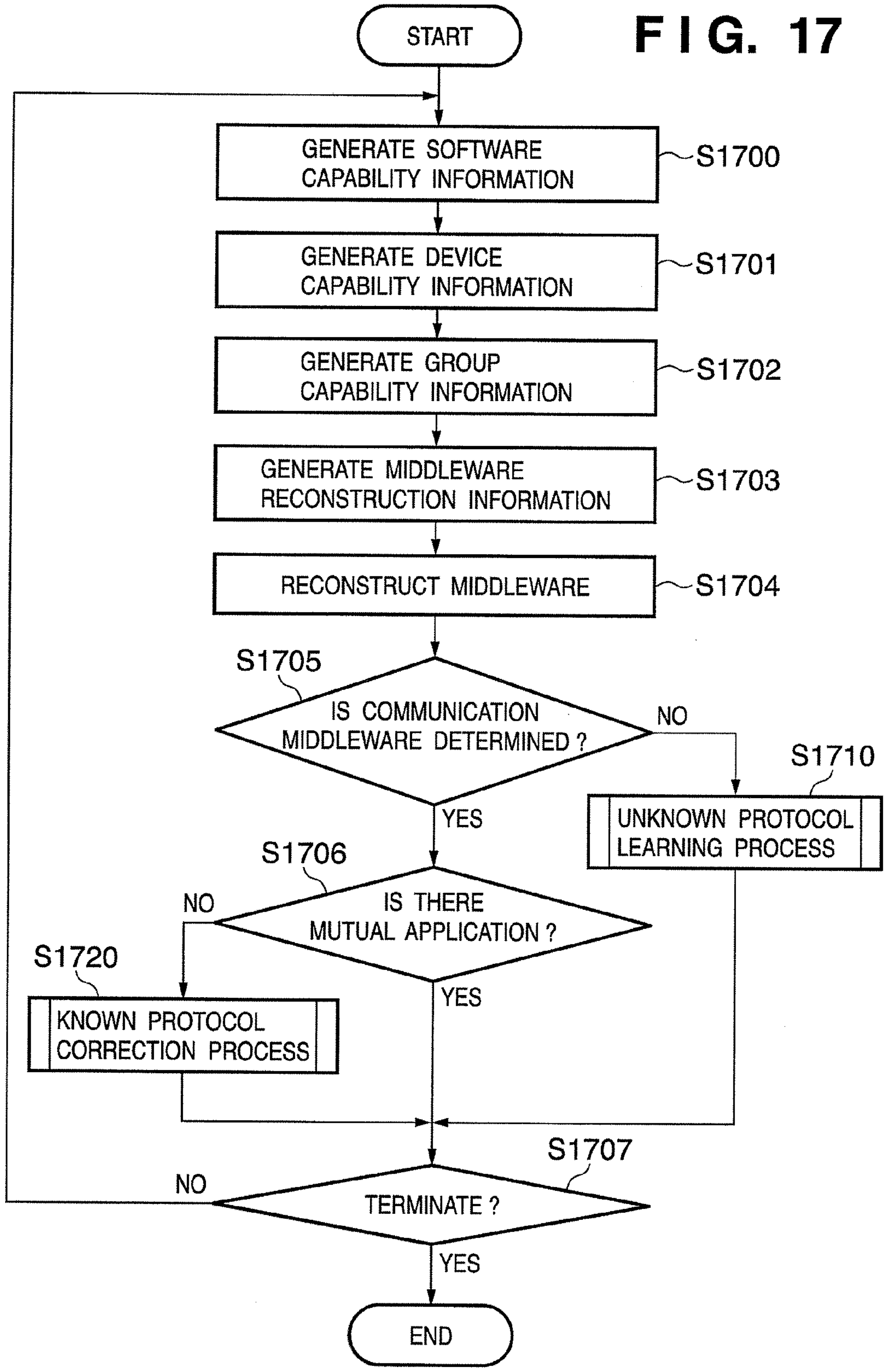
FIG. 17 is a flowchart for explaining processing in a network system (device capability management system) according to an embodiment of the present invention.

FIG. 17 is a flowchart for explaining the processing in the network system (device capability management system) according to the embodiment of the present invention.

First, in step S1700, software capability information of each software installed in each device connected to the network is generated. This process is performed by collecting, into capability information 1240, pieces of information of various software programs, such as application software, middleware, and firmware, installed in individual devices, from the software capability manager 1203 via the application manager 1202 and middleware manager 1208.

Then, in step S1701, device capability 207 as capability information for each device is generated from the software capability information 1240 collected in step S1700. Other devices are notified of the device capability 107 across the network 105. This notification is performed by the device capability manager 1204. Note that Internet Protocol (IP) is used to notify the other devices of the device capability 207. In this case, both versions IPv4 and IPv6 of IP can be used. A medium actually used as a communication path can be either a wired or wireless medium. Depending on the protocol, it is also possible to use a communication protocol such as TCP, UDP, HTTP, SMTP, SNMP, or FTP.

In step S1702, the device capabilities of the other devices connected to the network 105 are obtained and processed to generate group capability 208 to be given to a group including a plurality of devices configuring the network. This process is performed by the group capability manager 1205. In step S1703, the group capability 208 obtained in step S1702 and the device capability 207 obtained in step S1701 are compared, thereby generating middleware reconstruction information. This process is executed by the middleware optimizer 1206.

In step S1704, the middleware optimizer 1206 performs dynamic reconstruction including the stop and start of middleware by using the middleware reconstruction information generated in step S1703. This process is performed by the middleware reconstruction unit 1207.

In step S1705, it is determined on the basis of the result of the middleware reconstruction performed in step S1704 whether communication middleware to be activated exists or not. If it is determined in step S1705 that no communication middleware to be activated exists, the flow advances to step S1710, and an unknown protocol learning process is performed. This process is performed by the unknown protocol learning unit 1220. Note that the process in step S1710 will be described in detail later with reference to FIG. 18.

On the other hand, if it is determined in step S1705 that communication middleware to be activated exists, the flow advances to step S1706, and it is determined whether a protocol usable by the communication middleware is applicable or not to communication with other devices. This determination is done by actually performing communication by using the protocol, and determining whether the communication is successful. If it is determined in step S1706 that the protocol is inapplicable, the flow advances to step S1720, and a known protocol correction process is performed. This process is executed by the known protocol correction unit 1230. Note that the process in step S1720 will be described in detail later with reference to a flowchart shown in FIG. 20.

When one of steps S1706, S1710, and S1720 is executed as described above, the flow advances to step S1707 to determined whether to continue the processing. If it is determined in step S1707 that the processing is to be continued, the flow returns to step S1700, and the above processing is repetitively executed. If it is determined in step S1707 that the processing is to be terminated, this processing is terminated.

Figure 18:
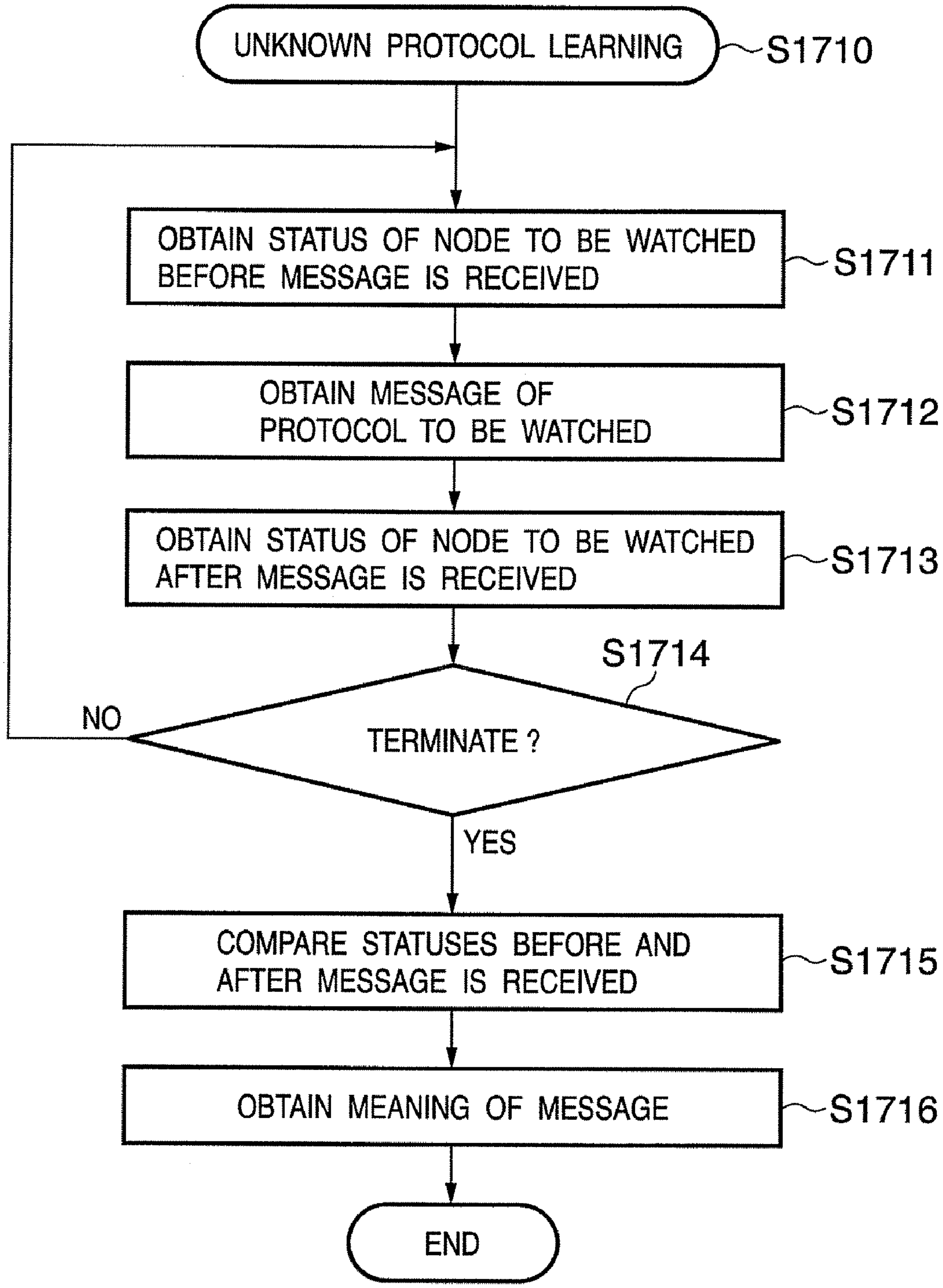
FIG. 18 is a flowchart showing an unknown protocol learning process in step S1710 of FIG. 17.

FIG. 18 is a flowchart showing the unknown protocol learning process in step S1710 of FIG. 17. This process will be explained by taking, as an example, the above-mentioned case shown in FIG. 5 in which device A learns an unknown protocol (protocol B) exchanged between devices B and C.

First, in step S1711, the learning controller 1221 in the unknown protocol learning unit 1220 of device A obtains the state of device B to be watched by using the protocol A. The learning controller 1221 transfers the thus obtained state of device B and the IP address of device B to the table read/write unit 1223, thereby recording these data in the protocol recording table 1226. That is, the table read/write unit 1223 writes the data in the IP address item 1601 and pre-state item 1603 of the protocol recording table 1226.

Then, in step S1712, the learning controller 1221 causes the protocol watching unit 1224 to watch a message using the protocol B transmitted from device C to device B, and record the result of watching. If a certain message is transmitted from device C to device B, the protocol watching unit 1224 acquires and stores the message, and transfers it to the learning controller 1221. The learning controller 1221 having received the message instructs the table read/write unit 1223 to write the message in the table 1226. Accordingly, the table read/write unit 1223 writes the obtained message in the message item 1602 corresponding to the IP address of device B in the protocol recording table 1226.

In step S1713, the learning controller 1221 obtains the state of device B by using the protocol A in the same manner as above. The learning controller 1221 transfers the thus obtained state of device B and the IP address of device B to the table read/write unit 1223, thereby recording these data in the protocol recording table 1226. That is, the table read/write unit 1223 writes the obtained state of device B in the post-state item 1604 at the same IP address as in the IP address item 1601 of the protocol recording table 1226.

This will be explained by taking FIG. 16 as an example. Assume that an IP address "192.168.0.11" 1610 corresponds to the IP address of device B. Reference numeral 1611 denotes a message transmitted from device C to device B; and numeral 1613 denotes the state of device B before the message is received. In the pre-state item 1603, the printer status is "idle". In 1613, the state of device B after the message is received is recorded, and the printer status is "processing".

In step S1714, it is determined whether or not to terminate the watching process. If it is determined in step S1714 that the process is to be continued, the flow returns to step S1711. If it is determined in step S1714 that the process is to be terminated, the flow advances to step S1715. In step S1715, the learning controller 1221 uses the table read/write unit 1223 to read out the data recorded in the protocol recording table 1226. On the basis of the readout data, the state (pre-state item 1603) before device B receives the message from device C is compared with the state (post-state 1604) after the message is received, thereby selecting, from existing the protocol A, a command which has the same function as the command using the protocol B. The learning controller 1221 instructs the table read/write unit 1223 to record the selected command in the effective command item 1605.

Consequently, in the example shown in FIG. 16, "Print" is stored in 1613 as that command of the protocol A, which has the same function as the command of the protocol B.

In step S1716, the learning controller 1221 uses the table read/write unit 1223 to store the IP address of device B in the IP address item 1501 of the command table 1225, and record "True" in the protocol applicability item 1502 (FIG. 15). In addition, the learning controller 1221 stores the IP address of device C in the IP address item 1501 of the command table 1225, and records "false" in the protocol applicability item 1502.

By the above processing, when accepting a request from an application, device A obtains the IP address of the transmission destination, and uses the table read/write unit 1223 to obtain the value of the protocol applicability item 1502 from a record having the same value in the IP address item 1501 of the command table 1225. If the value of the protocol applicability item 1502 is "True", device A determines that existing protocol A is to be used. If the value of the protocol applicability item 1502 is "false", device A determines that the protocol B is to be used. After that, device A transfers the command to the learning controller 1221.

The learning controller 1221 thus having received the command and the corresponding IP address searches the protocol recording table 1226 by using the table read/write unit 1223. The learning controller 1221 deduces a record having the same command as stored in the effective command item 1605, from records having the same IP address as the value of the IP address item 1601. The learning controller 1221 obtains the value of the message item 1602 of the thus deduced record, and transfers the value to the virtual protocol generator 1222. In this manner, the virtual protocol generator 1222 of device A generates a virtual protocol on the basis of the message item 1602, and transmits a message to device C. Note that Internet Protocol (IP) is used to transmit the message. In this case, both versions IPv4 and IPv6 of IP can be used. A medium actually used as a communication path can be either a wired or wireless medium. Depending on the protocol, it is also possible to use a communication protocol such as TCP, UDP, HTTP, SMTP, SNMP, or FTP. In this way, device A can communicate with device C by using the protocol B.

Figure 19:
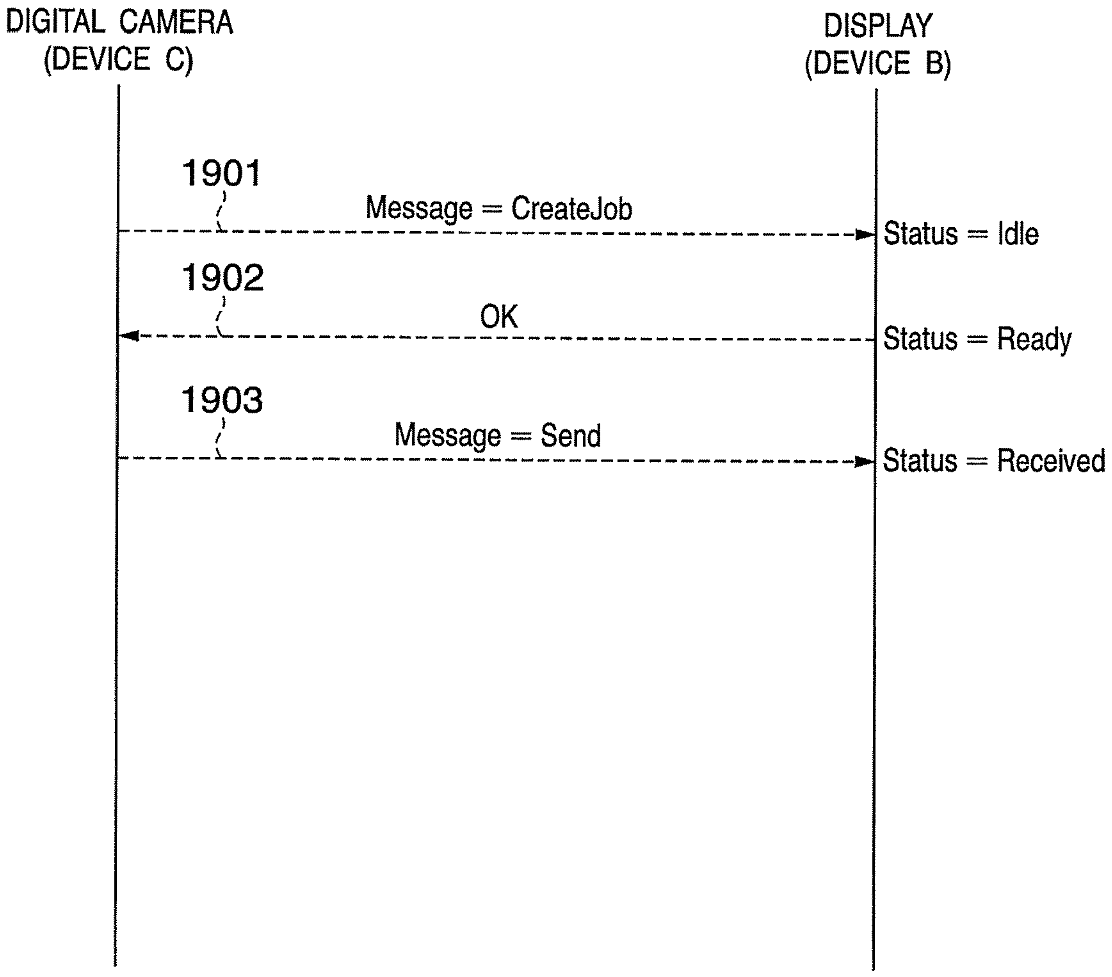
FIG. 19 depicts a view for explaining an image data transfer sequence (protocol B) between a display (display unit) (device B) and a digital camera (device C)

FIG. 19 depicts a view for explaining an image data transfer sequence (protocol B) between a display (display unit) (device B) and a digital camera (device C) . Assume that device A uses the protocol A and intends to communicate with device C by protocol B by monitoring the status of device B.

First, assume that device A recognizes that the status of device B is “Idle” before 1901. Then, in 1901, device C notifies device B that there is a job. When device B responds to the notification by “OK” (1902), the status of device B changes from “Idle” to “Ready”. Consequently, device A acquires a message “CreateJob” using the protocol B between devices B and C. Also, device A detects, by using the protocol A between devices A and B, that the status of device B has changed to “Ready”. In 1903, data (a message) to be displayed is transmitted from device C to device B. As a consequence, the status of device B changes from “Ready” to a mode “Received (start of image display)” in which data is received. Device A acquires a message “Send” using the protocol B between devices B and C. In addition, device A detects, by using the protocol A between devices A and B, that the status of device B has changed to “Received (start of image display)”.

Device A having obtained and stored these pieces of information in the protocol recording table 1226 obtains that command of the protocol A, which corresponds to the command (1901) of the protocol B by which the status of the display (device B) changes from “Idle” to “Ready”. Device A also obtains that command of the protocol A, which corresponds to the command (1903) of the protocol B by which the status of the display (device B) changes from “Ready” to “Received”. Device A becomes able to communicate with device C (the digital camera) by forming virtual protocol B by using these commands. That is, on the basis of the contents of the messages received by device B and the changes in status of device B, device A can detect the commands (e.g., CreateJob and Send) used by using the protocol B to transmit data.

To transfer an image from device A to device C (the digital camera), therefore, a message corresponding to “CreateJob” of the protocol B is first transmitted to device C (the camera) . When device C responds to this message by “OK”, the status of device C (the digital camera) changes from “Idle” to “Ready”. Then, a message which corresponds to “Send” of the protocol B and to which data (an image) to be saved is given is transmitted from device A to device C. Consequently, the status of device C changes from “Ready” to a mode “Received (start of image saving)” in which data is received. That is, device A can transmit image data to device C by using the protocol B by forming commands which are used in the protocol B to transmit data and learned by device A on the basis of the changes in status of device B.

As described above, device A can communicate with device C by using the virtual protocol B.

Figure 20:
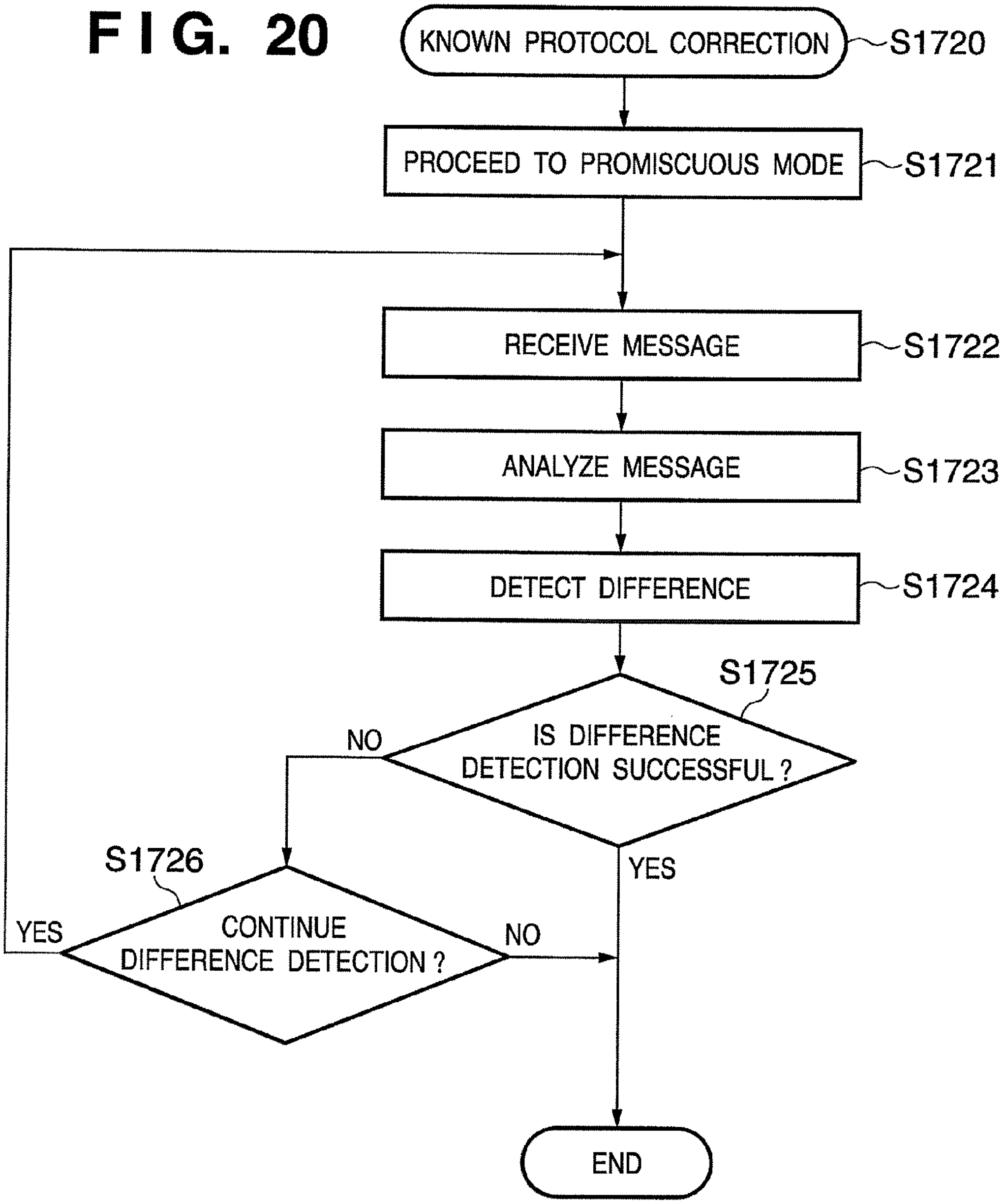
FIG. 20 is a flowchart showing a known protocol correction process in step S1720 of FIG. 17.

FIG. 20 is a flowchart showing the known protocol correction process in step S1720 of FIG. 17.

First, in step S1721, the protocol data collection unit 1232 in the known protocol correction unit 1230 according to this embodiment requests the message transmission/reception unit 1210 to operate the network interface 1104 managed by the protocol data collection unit 1232 in a promiscuous mode, in order to receive all packets flowing across the network 105. Then, in step S1722, the message receiver 1212 receives messages flowing across the network 105. Note that Internet Protocol (IP) is used to receive messages by the message receiver 1212. In this case, both versions IPv4 and IPv6 of IP can be used. A medium actually used as a communication path can be either a wired or wireless medium. Depending on the protocol, it is also possible to use a communication protocol such as TCP, UDP, HTTP, SMTP, SNMP, or FTP.

In step S1723, the protocol data collection unit 1232 analyses the messages received in step S1722. In step S1724, the difference detector 1233 in the known protocol correction unit 1230 detects difference information between the protocol controlled by the communication middleware 1209 and the data analyzed in step S1723 by the protocol data collection unit 1232. When the protocol is, e.g., “HTTP/1.1”, the detected difference information is a trivial difference such as the difference between the character strings “GET” and “get” in the first rows shown in FIGS. 7 and 9.

The difference information thus detected is recorded in the form of a table shown in FIG. 21.

FIG. 21 depicts a view showing a practical example of the table storing the difference information detected by the difference detector 1233.

This table stores the watching time, and the transmission source address, transmission destination address, transmission source port, transmission destination port, and difference information of the message. In this example of the difference information, information indicating that there is a difference between the character strings “GET” and “get” by the protocol “HTTP/1.1” in the first row (1cl) of the message is stored.

In step S1725, it is determined whether the difference information is successfully detected or not. If it is determined that the detection is successful, this process is terminated. If it is determined that the detection of the difference information has failed, the flow advances to step S1726, and it is determined whether or not to continue the data collection/difference detection process. The determination criterion in step S1726 is, e.g., whether the collection time or collection count has reached a predetermined time or predetermined count. Note that the determination criteria in this process are not limited to these two conditions, and an arbitrary determination criterion can be applied. If it is determined in step S1726 that the data collection/difference detection process is to be continued, the flow returns to step S1722. If it is determined in step S1726 that the data collection/difference detection process is to be terminated, this process is terminated, and the flow advances to step S1707 of FIG. 17.

For example, if a control command “GET” is transmitted and an error message is received, a message having a predetermined relationship with the transmitted “GET” is collected (e.g., a command “get” which is different from “GET” in character type indicating an uppercase letter or lowercase letter). If this difference information (the difference between the character types, i.e., the uppercase letter and lowercase letter) is successfully detected (step S1722), “get” is transmitted instead of “GET” after that.

The following processing is performed if an error is caused by a parameter added to a command (e.g., if an error occurs because the receiving side requires HOST (the Internet host and port number) and Accept-Language (a language desired as a response) used as GET methods of HTTP as essential parameters to be added to a “GET” command, but the transmitting side transmits a “GET” command to which only HOST is added (to which Accept-Language is not added) as a parameter.

The transmitting side collects a command having a predetermined relationship with the “GET” command having caused the transmission error. In this case, a “GET” command having additional parameters different from that of the “GET” command having caused the transmission error (i.e., a “GET” command to which “HOST” and “Accept-Language” are added as parameters) is collected. If this parameter difference is successfully detected (step S1725), the “GET”

command to which “HOST” and “Accept-Language” are added is used instead of the “GET” command to which only “HOST” is added after that. Note that as “Accept-Language”, it is only necessary to request “Accept-Language” preset on the transmitting side. It is also possible to display the contents of “Accept-Language” added to the collected “GET” command, and allow the user to select desired “Accept-Language” from the displayed contents.

Note that the transmitting side determines whether the device on the transmitting side has a parameter (e.g., “Accept-Language”) requested by the receiving side. If the device does not have the parameter, the transmitting side determines that the protocol used by the receiving side is unallowable, and stops transmitting the message to the receiving side. Note also that the same processing is applicable to a case in which commands have both a difference between uppercase letters and lowercase letters and a difference between parameters added to the commands.

In this embodiment as explained above, it is possible to achieve not only optimization inside a single device, but also optimization on the device network level of communication middleware installed in a device having a communication function. That is, when devices each having a plurality of communication middleware programs gather to form a group, it is possible, inside each device, to dynamically construct a desirable communication middleware combination making the most of the characteristics of the group.

In this case, an application in each device need not detect this reconstruction of the communication middleware, and the provided function does not deteriorate. Accordingly, while a plurality of high-level function communication middleware programs are installed, processing can be executed without using any unnecessary middleware. As a consequence, a device capable of effectively using the computer resources can be achieved.

Also, if no communication middleware to be activated exists, i.e., if a device cannot perform communication using the corresponding protocol, it is possible, by using a known protocol, to store a pair of a message by an unknown protocol and the status of a device having received the message, and cope with the unknown protocol.

Furthermore, even when communication middleware to be activated exists, its specifications are not strict but ambiguous. Therefore, even when the vender of a device has intended to install a protocol completely in accordance with its specifications, the ambiguity of the specifications may produce a difference between interpretations, and this may cause a communication failure. Even in a case like this, it is possible to secure communication between a user’s device and another device by detecting a difference between a protocol used by the user’s device and another protocol which is effective on a network to which the user’s device is connected, and correcting the protocol of the user’s device.

As has been explained above, this embodiment has the following effects.

(1) It is possible to achieve not only optimization inside a single device, but also optimization of communication middleware installed in a device having a communication function on the level of a device network connecting a plurality of devices. That is, when devices each having a plurality of communication middleware programs gather to form a group, it is possible, inside each device, to dynamically construct an optimum communication middleware combination making the most of the characteristics of the group. In this case, an application in each device need not detect this reconstruction of the communication middleware, and the provided function does not deteriorate. Accordingly, while a plurality of high-level function communication middleware programs are installed, processing can be executed without using any unnecessary middleware, so the computer resources can be effectively used.

(2) If no communication middleware to be activated exists, i.e., if a device is unable to perform communication using the corresponding protocol, a known protocol is used to store a pair of a message by an unknown protocol and the status of a device having received the message. The former device can cope with the unknown protocol by using a corresponding command which is included in the known protocol and causes the above-mentioned status of the latter device.

(3) Even when vague portions of the specification of a protocol produce a difference between interpretations and make communication impossible although the vender of a device has intended to install the protocol completely in accordance with the specification, communication with the device can be performed by detecting a difference between a protocol used by a user’s device and the protocol of interest, and correcting the protocol of the user’s device.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Application No. 2005-224592 filed Aug. 2, 2005, which is hereby incorporated by reference herein in its entirety.

What is claimed is:

1. A network device comprising:

a storage medium including instructions accessed by a CPU or MPU and thereby implementing the following units, a communication management unit that manages a plurality of types of communication middleware;

an obtaining unit that obtains capability information of a device existing on a network;

a first determination unit that determines which communication middleware of the plurality of types of communication middleware of the communication management unit is to be activated/inactivated, on the basis of the capability information obtained by the obtaining unit;

a communication unit that executes communication between devices across the network by using communication middleware found to be activated by the first determination unit;

a second determination unit that determines whether a first command in a protocol used by the communication middleware determined to be activated by the first determination unit and transmitted by the communication unit to a first device of the devices is accepted by the first device or not;

a collection unit that collects a second command which is received by the communication unit and related to the first command in the protocol used by the communication middleware determined to be activated by the first determination unit, in a case where the first command in the protocol used by the communication middleware determined to be activated by the first determination unit is not accepted by the device;

a detecting unit that detects a difference in case of character between character strings indicating the first command that was not accepted by the first device and the second command a protocol correction unit that corrects communication middleware of the communication management unit for communicating with the first device in accordance with the difference detected by the detection unit; and a control unit that controls the communication unit to send to the first device a command generated using the communication middleware corrected by the protocol correction unit.

2. A method of controlling a network device comprising a plurality of types of communication middleware, the method being implemented by a CPU or MPU that accesses instructions stored in a storage medium, the method, comprising:

an obtaining step of obtaining capability information of a device existing on a network;

a first determination step of determining which communication middleware of the plurality of types of communication middleware is to be activated/inactivated, on the basis of the capability information obtained in the obtaining step;

a communication step of executing communication between devices across the network by using communication middleware found to be activated in the first determination step;

a second determination step of determining whether a first command in a protocol used by the communication middleware determined to be activated in the first determination step and transmitted in the communication step to a first device of the devices is accepted by the first device or not;

a collection step of collecting a second command which is received in the communication step and related to the first command in the protocol used by the communication middleware determined to be activated in the first determination step, in a case where the first command in the protocol used by the communication middleware determined to be activated in the first determination step is not accepted by the first device;

a detection step of detecting a difference in case of character between character strings indicating the first command that was not accepted by the first device and the second command a correction step of correcting the communication middleware for communicating with the first device in accordance with the difference detected in the detection step; and a control step of controlling the communication step to send to the first device a command generated using the communication middleware corrected in the correction step.

3. A non-transitory computer-readable storage medium for storing a computer program which controls a network device comprising a plurality of types of communication middleware, said computer program comprising:

an obtaining module adapted to obtain capability information of a device existing on a network;

a first determination module adapted to determine which communication middleware of the plurality of types of communication middleware is to be activated/inactivated, on the basis of the capability information obtained by the obtaining module;

a communication module adapted to execute communication between devices across the network by using communication middleware found by the first determination module;

a second determination module adapted to determine whether a first command in a protocol used by the communication middleware determined to be activated by the first determination module and transmitted by the communication module to a first device of the devices is accepted by the first device or not;

a collection module adapted to collect a second command which is received by the communication module and related to the first command in the protocol used by the communication middleware determined to be activated by the first determination module, in a case where the first command in the protocol used by the communication middleware determined to be activated by the first determination module is not accepted by the first device;

a detection module adapted to detect a difference in case of character between character strings indicating the first command that was not accepted by the first device and the second command a correction module adapted to correct the communication middleware for communicating with the first device in accordance with the difference detected by the detection module; and a control step of controlling the communication module to send to the first device a command generated using the communication middleware corrected by the protocol correction module.

* * * * *